May 25, 1926.
E. A. KUEN
LAMP CLOSURE FASTENING
Filed March 26, 1923
1,585,868
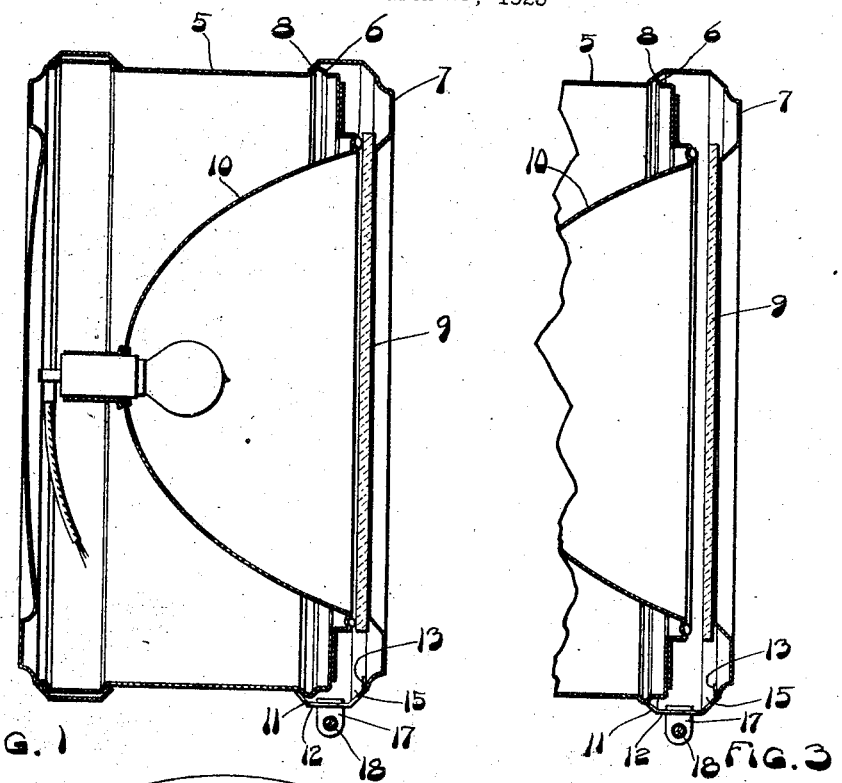
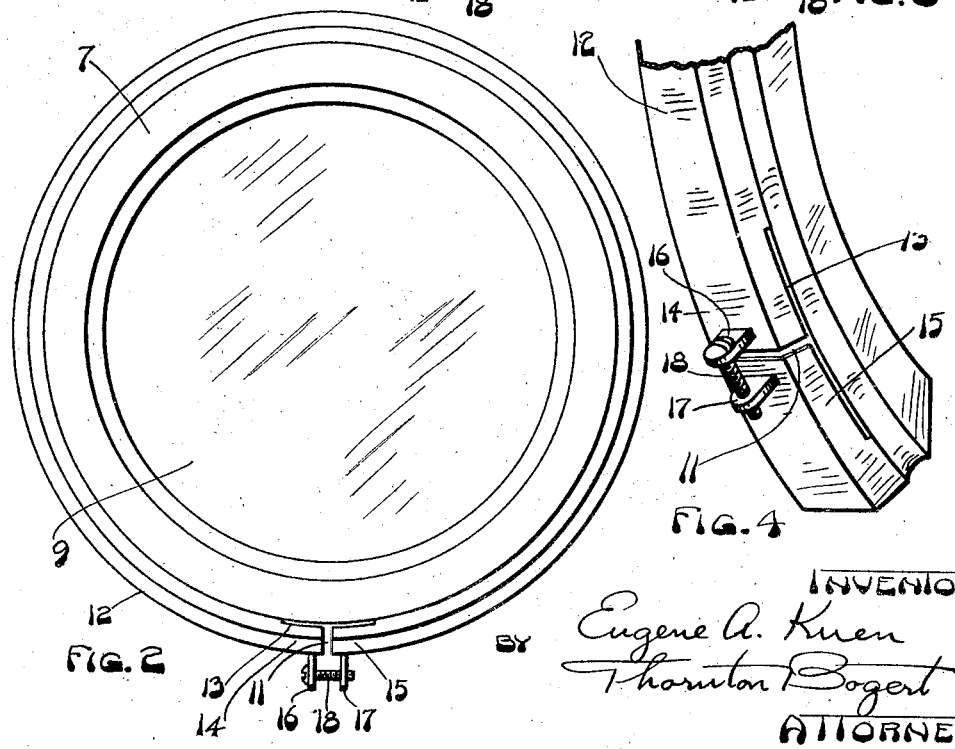

Patented May 25, 1926.

1,585,868

UNITED STATES PATENT OFFICE.

EUGENE A. KUEN, OF CINCINNATI, OHIO, ASSIGNOR TO THE THOS. J. CORCORAN LAMP CO., OF CINCINNATI, OHIO.

LAMP-CLOSURE FASTENING.

Application filed March 26, 1923. Serial No. 627,630.

This invention relates to an improved closure fastening which is particularly adapted to automobile lamps.

An object of my invention is to produce an improved closure fastening in which the body, reflector, closure glass and closure rim are held together in a manner such as to prevent relative movement of the lamp parts and to prevent vibration thereof.

A further object is to produce a fastening by virtue of which the parts are held together yieldingly and in a manner such that inadvertent disengagement of the parts is prevented.

A further object is to produce a closure fastening which is cheap and in which relatively expensive springs and other expensive and more or less complicated and unsatisfactory fastening devices are eliminated.

These and other objects are attained in the construction described in the following specification and illustrated in the accompanying drawing in which:—

Fig. 1 is a sectional elevation of a lamp having a closure fastening embodying my invention.

Fig. 2 is a front elevation of the lamp shown in Fig. 1.

Fig. 3 is a fragmental view of the lamp shown in Fig. 1, but showing the closure partially removed from the body to show the operation of removing it.

Fig. 4 is a fragmental perspective view of a closure rim and fastening device embodying my invention.

My improved fastening is a simplified type which is capable of application to all styles and designs of automobile lamp closures and bodies. However, in illustrating my invention I have chosen to show it in connection with an automobile lamp of the so called drum type, in which the body 5 is provided with a shoulder or bead 6 adjacent to its forward edge. The closure rim 7 which engages the body, may be of conventional type, but is provided with a rearwardly and inwardly extending flange 8 adapted normally to pass over shoulder 6, but, when in fastened position, to be brought into clamping engagement with the shoulder as shown in Fig. 1, thus holding the closure glass 9, reflector 10, and other parts of the lamp in proper relation to each other. My improved fastening consists merely in providing rim 7 with a substantially T-shaped slot having one branch 11 extending axially of the outer portion 12 of the rim and the other branch 13 extending circumferentially of the outer portion to each side of the branch 11. This forms two tongues 14 and 15 on the outer portion 12 of the rim. Secured to these tongues and in spaced relation to each other are two clamping lugs 16 and 17. Lug 16 has an unthreaded aperture for the passage therethrough of a screw 18, lug 17 being threaded for the reception of the screw. When the screw is loosened, the flange 8 of the closure rim will pass over the shoulder 6 of the body, but when the screw is tightened, the flange 8 will be drawn tightly over the bead with its inner edge closely adjacent to the cylindrical portion of the body. By reason of the branch 13 of the T-shaped slot, this slight but effective distortion of the closure rim is permitted and by reason of the rearward and inward inclination of flange 8 in cooperation with the shoulder, the closure rim is drawn toward the body as well as clamped circumferentially thereon, thus drawing all the parts together snugly and preventing any relative movement thereof in any direction.

By means of my improved fastening, the body construction, as well as that of the closure, is materially simplified and cheapened, springs of difficult and expensive manufacture are eliminated, and a more easily operated construction in which more satisfactory results are obtained, is secured.

Having thus described my invention what I claim is:

In combination with a beaded lamp body and a closure glass, a closure rim having a forward imperforate glass engaging portion and a slotted rearward body engaging portion, the slotted portion having an inclined rear flange adapted to engage the body bead, and means adapted to contract the slotted portion of the rim upon the bead, whereby the inclined rear flange will draw the forward imperforate portion of the rim rearwardly into clamping engagement with the glass upon contraction of the slotted portion of the rim.

EUGENE A. KUEN.